United States Patent [19]
Hedström et al.

[11] Patent Number: 5,595,551
[45] Date of Patent: Jan. 21, 1997

[54] METHOD FOR CONTROL OF ENGINE TORQUE DURING GEAR CHANGING

[75] Inventors: Lars-Gunnar Hedström, Vagnhärad; Roger Andersson; Göran Söderman, both of Södertälje; Torbjörn Gustavsson, Nyköping, all of Sweden

[73] Assignee: Scania CV Aktiebolag, Sweden

[21] Appl. No.: 436,622

[22] Filed: May 8, 1995

[30] Foreign Application Priority Data

May 13, 1994 [SE] Sweden ................... 9401653

[51] Int. Cl.$^6$ .................................. B60K 41/08
[52] U.S. Cl. ........................................ 477/109
[58] Field of Search ......................... 477/109, 904

[56] References Cited

U.S. PATENT DOCUMENTS

| | | | |
|---|---|---|---|
| 4,493,228 | 1/1985 | Viukovich et al. | 477/109 |
| 4,724,723 | 2/1988 | Lockhart et al. | 477/109 |
| 4,819,163 | 4/1989 | Shimizan et al. | 477/109 |
| 4,850,236 | 7/1989 | Braun . | |
| 5,038,287 | 8/1991 | Taniguchi et al. | 477/109 |
| 5,058,013 | 10/1991 | Iwatsuki et al. | 477/109 |
| 5,101,687 | 4/1992 | Iwatsuki et al. | 477/109 |
| 5,136,897 | 8/1992 | Boardman . | |
| 5,184,577 | 2/1993 | Kato et al. | 477/109 |
| 5,211,680 | 5/1993 | Sumimoto et al. | 477/109 |
| 5,407,401 | 4/1995 | Bullmer et al. | 477/109 |

Primary Examiner—Dirk Wright
Attorney, Agent, or Firm—Ostrolenk, Faber, Gerb & Soffen, LLP

[57] ABSTRACT

The invention relates to an improved method for ensuring that at the time of disengagement of a gear in connection with changing gear in mechanical gearboxes without clutch disengagement the engine torque is adjusted to a zero-torque level which is continuously corrected on the basis of the instantaneous acceleration of the engine but also on the basis of the internal friction of the engine and on the basis of any power take-offs being powered by the engine.

In gear changing, adjustment begins with a torque reduction at time $t_1$. The torque is reduced to a zero-torque level $M_0$ which is continuously variable during the reduction and which is adapted to the current engine deceleration and which is corrected by a friction factor $M_f$ and an acceleration factor $M_a$. The friction factor $M_f$ is derived from a matrix $M_f(n,T)$ on the basis of current engine speed n and engine temperature T, and the acceleration factor $M_a$ is calculated continuously during the decrease (t1–t2) on the basis of the engine's moment of inertia and the instantaneous engine acceleration. The zero-torque level is also corrected on the basis of any power take-offs in operation, by means of a power take-off factor $M_{pto}$. Both $M_{pto}$ and $M_f$ are updated to compensate for changes due to wear.

16 Claims, 4 Drawing Sheets

METHOD FOR CONTROL OF ENGINE TORQUE DURING GEAR CHANGING

BACKGROUND OF THE INVENTION

The invention relates to a method for control of engine torque during automated gear changing in mechanical stepped gearboxes.

During automatic gear changing in mechanical stepped gearboxes, an adjustment of the torque delivered by the engine is required in order to reduce the torque transmitted by the current gear combination.

In cases where a clutch servo is incorporated and there is automatic disengagement of the disc clutch, which is conventionally situated between the engine and the gearbox, the torque load which the engine imposes on the gear combination is removed automatically. In such cases the primary purpose of engine torque reduction, which is achieved by reducing the fuel quantity, is to prevent the engine racing when the clutch breaks the connection between the engine and the gearbox. This means that the torque levels down to which the engine is adjusted in connection with disengaging the gear become less critical. Such a gear change system with clutch servo and fuel reduction in connection with gear disengagement is applied in U.S. Pat. No. 5,136,897, in which thereafter, when the next higher gear is engaged, the engine acceleration caused by subsequent fuel boost is detected with a view to ordering re-engagement of the disc clutch so that the latter re-engages at the same time as the synchronous speed calculated on the basis of the engine acceleration is reached and the gear is engaged.

Another solution for making it easy in the higher gears to change up without disengaging the disc clutch is described in U.S. Pat. No. 4,850,236, which applies a method whereby the gear disengagement servo is ordered to disengage the gear, after which the torque is adjusted so that a transmitted positive torque forcibly modulated from the engine with increased fuel quantity changes to a torque reduction by reduction of the fuel quantity, which reduction proceeds until the transmitted torque in the current gear combination changes to a negative torque, thereby resulting in zero torque taking place during simultaneous action of the gear disengagement servo. A disengaging force may thus be exerted on the gear, which springs out when this zero-torque transition takes place. This method may be sufficient for achieving gear changes without disc clutch disengagement between higher gears, since the requirement for precise engine adjustment is not as manifest as during automatic gear change without disengagement between lower gears. This solution does mean, however, that during the torque adjustment the gear disengagement servo acts on the gear combination in a disengaging direction, which may cause bangs when the gear combination disengages if the disengaging force is great enough for disengagement to take place before the zero-torque level is reached. This method may also result in increased wear on gearwheels.

SUMMARY OF THE INVENTION

The primary object of the invention is to ensure gentle gear changing in a mechanical stepped gearbox without disengaging the disc clutch, with high gear change comfort, low wear on gearwheels and high gear change reliability even in lower gears without disengaging the disc clutch.

A further object is to ensure that the gear is disengaged in a situation in which zero torque is being transmitted in the current gear combination independently of whether the vehicle is being subjected to deceleration, e.g. when changing gear on uphill runs, or to acceleration, e.g. on downhill runs. This zero-torque level with respect to which the torque delivered by the engine is adjusted is continuously corrected by an acceleration-dependent factor based on instantaneous changes in the acceleration of the engine during the adjustment of the torque delivered by the engine before gear disengagement, so that in the course of gear disengagement the acceleration/deceleration of the engine is always maintained substantially constant immediately before and after gear disengagement.

Another object is to be able to calculate the torque supplied to the gearbox, on the basis of deceleration or acceleration of the vehicle, without using any expensive torque sensor in the gearbox or any gradient sensor in the vehicle.

The foregoing and other objects are accomplished in accordance with the present invention by measuring the engine acceleration $a_m$; determining an acceleration factor $M_a$ as a function of the engine acceleration $a_m$; before disengaging a gear, reducing the torque delivered by the engine to a zero-torque level $M_0$ which is based on at least the measured engine acceleration value $a_m$; disengaging the gear; and, thereafter, accelerating the engine to a value which corresponds to the engine's instantaneous value of acceleration before disengagement of the gear.

Another object is that the zero-torque level should also be adapted to any operating power take-offs, so that gear disengagement can take place in a torque-free situation irrespective of whether one or more power take-offs are being driven by the engine. This object is achieved in accordance with the present invention by adjusting engine torque to a level which is also determined by a power take off factor $M_{pto}$ which is a function of the additional torque required to power at least one power take off driven by the engine while maintaining the engine at a constant speed in an otherwise no load condition.

A further object is to continuously correct the torque factors which determine the zero-torque level and which themselves depend on the wear of the engine or of the power take-offs, so that gear change comfort is maintained despite variations in these torque factors over time.

In this respect, in accordance with, the invention the engine's moment of inertia, the engine's moment of friction and the necessary additional torque for each power take-off activated are selectively updated.

Other features and advantages of the present invention will become apparent from the following description of the invention which refers to the accompanying drawings.

DESCRIPTION OF THE PREFERRED EMBODIMENT(S)

Figure 1:
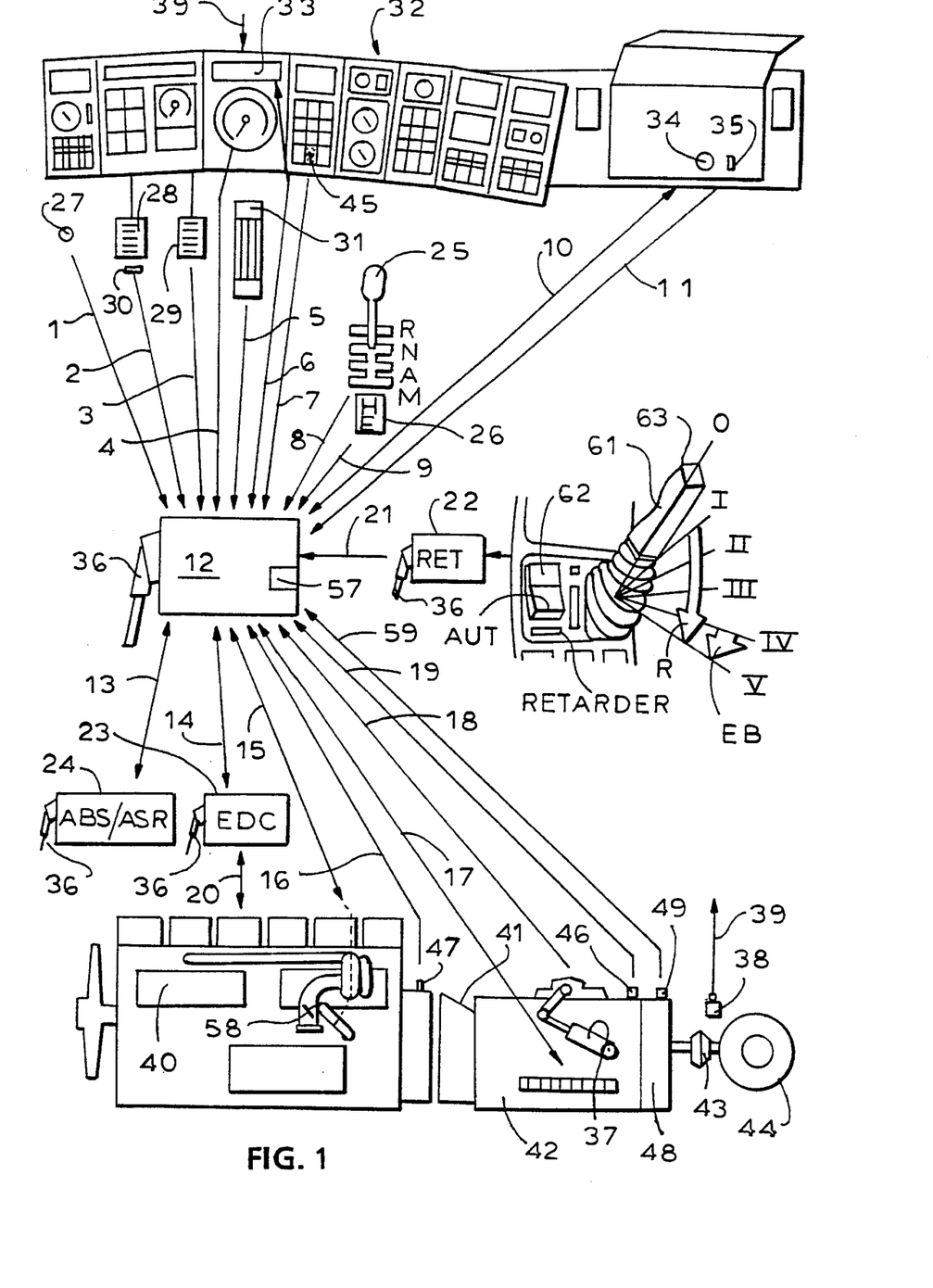
FIG. 1 depicts schematically the composition of a gear change system for mechanical stepped gearboxes.

FIG. 1 depicts a gear change system for monitoring and control of the computer-assisted operation of mechanical gearboxes in a motor vehicle. The vehicle is powered by a combustion engine 40, preferably a diesel engine, which via a clutch 41 operated by the driver can transmit driving power to the vehicle's driving wheels 44 via a mechanical stepped gearbox 42 and propeller shaft 43. The gearbox 42 preferably incorporates an integrated retarder 48 with which an adjustable retarder braking effect can be exerted on the driveline with the object of achieving a high braking effect on the vehicle without using the vehicle's ordinary wheel brakes. The gear change system in this embodiment incorporates a manually operated clutch servo for starting and stopping, with no automatic clutch servo, but the invention may also be applied in systems with automated clutch.

The gear change system executes gear changes by adjusting the engine speed and the engine torque in the course of gear changes and by operating the servo which disengages the current gear and engages the next gear without disengaging the clutch 41. The result is high demands on the engine control arrangements and with regard to the speed information which the system requires for the engine control arrangements to facilitate the torque-free disengagement of a gear, and for quickly achieving, by means of the engine control arrangements only, the synchronous speed for the next gear, which has to be engaged with the shortest possible torque break in the mechanical stepped gearbox.

Mechanical stepped gearboxes, preferably with or without conventional synchronising arrangements in the gearbox, are from many points of view a considerably more advantageous choice than conventional hydraulic automatic gearboxes which change gear without torque break or than mechanical gearboxes with complicated double clutches which have to provide gear changing without torque break. This is particularly so from the cost point of view as regards operating economy, servicing and purchase cost. If the stepped gearbox also incorporates conventional synchronisations, the result is also increased operating safety in that manual gear changing or semi-automatic gear changing, i.e. servo-assisted disengagement and engagement of gears as a consequence of manual clutch disengagement, can be performed if the automated gear change function is eliminated by system failure, while maintaining a high degree of gear change comfort.

The gear change system incorporates a control unit 12 with microcomputer which is connected by various signal lines 36 to control units for the fuel system 23, the retarder system 22 and the vehicle brake system 24. These signal lines convey to the control unit 12 various signals corresponding to the signals 1–11, 13–19, 21 and 59 represented by arrows in FIG. 1.

The control unit 12 receives the following input signals:

Signal 1 from a brake programme contact 27 which is situated accessibly for foot operation by the driver. The brake programme contact acts on the retarder function via the control unit 22 but also on the gear change points of the gear change system when the brake programme contact is activated.

Signal 2 from a clutch contact 30 which detects the position of the clutch pedal.

Signal 3 from the vehicle foot brake pedal, indicating the position of the brake pedal.

Signal 4 from the vehicle's tachometer, with secondary information on the vehicle's road speed or propeller shaft speed.

Signal 5 from the vehicle's accelerator pedal, indicating the current position of the accelerator pedal.

Signal 7 from an exhaust brake actuator 45 situated on an instrument panel 32.

Signal 8 from the gear lever, indicating the gear change system operating state chosen by the driver, either in automatic position A, neutral position N, manual position M or reversing R, and any corrections made by the driver to the automatically selected gear in automatic position A or to a new gear selection in any manual position N,M,R.

Signal 9 from a driving programme selector 26 whereby the driver can select, for example, economy programme E, which gives gear change points with optimum fuel economy and gentle gear changes, or hill programme H whereby the gear change points are set so as to provide maximum tractive force and give rapidity of gear change priority over comfort and quietness.

Signal 11 from a diagnostic selector 35 by which a test programme incorporated in the software of the control unit can be activated for servicing or fault location by means of hull signalling on the instrument panel information field 33.

Signal 21 from the retarder control unit 22 which modifies the gear change points whenever the signal from the retarder function is activated so as to provide increased engine brake effect and coolant flow.

Signal 19 from an speed sensor situated on the output shaft of the gearbox 42, preferably the propeller shaft 43.

Signal 18 from gear sensors in the gearbox 42 which indicate which gear is engaged.

Signal 16 from a speed sensor situated on the input shaft of the gearbox 42, preferably on the engine's crankshaft or flywheel.

Signal 59 from a temperature sensor 49 which detects the temperature of the cooling water leaving the retarder.

The control unit 12 adjusts various servos or lights up information fields on the instrument panel 32 by the following output signals:

Signal 6 is directed to an information field 33 on the instrument panel 32 which indicates to the driver the gear change system operating state (A,N,M,R), current gear, next gear, driving programme (E,H) and any fault codes, warnings and other information.

Signal 17 is directed to various solenoids in the gearbox which activate servos for operating gear change carriers so that gears can be disengaged and engaged respectively.

Signal 15 is directed to the exhaust brake 58 situated in the engine's exhaust system so that the exhaust brake in addition to its function as a supplementary brake can be activated to reduce the engine speed quickly to synchronous speed, particularly when changing up to gears with lower gear ratios.

The control unit 12 is also in two-way communication in that it transmits output signals to and receives input signals from a number of control units via the following links:

Link 10 connected to the diagnostic socket 34 whereby diagnostic equipment can tap fault codes from the control unit 12 and carry out software testing of the functioning of the control unit.

Link 13 connected to the control unit for the antilocking function of the brakes (ABS) and antiskid function (ASR), whereby the brake control unit may inter alia prevent gear changes when the ASR function is active.

Link 14 connected to the fuel system control unit 23 which in its turn, via link 20, adjusts the fuel quantity at the injectors of the combustion engine.

In the system indicated above, gear changing in the A position of the gear lever takes place automatically according to the engine parameters detected, such as vehicle speed, engine load and speed, and the derivatives of one or more of the factors vehicle speed/accelerator position/engine speed, if the accelerator pedal is fully depressed (so-called kickdown) and if braking takes place. Gear changing is performed automatically so as to achieve optimum fuel consumption and performance.

The retarder control unit 22 incorporates a manual control 61 which is preferably situated on the instrument panel 32. This control may be placed in a number of positions O–V, whereby the initial position 0 causes the retarder 48 to be disconnected and the positions I, II, III, IV and V cause a progressive increase in the braking effect of the retarder. Position I can produce a braking torque of 500 Nm, position II of 1000 Nm, position III of 1500 Nm, position IV of 2000 Nm and position V the maximum retarder braking effect of approximately 3000 Nm. It is advantageous for this latter braking effect step V to incorporate also simultaneous activation of the vehicle's exhaust brake 58/EB, thereby further increasing the braking effect on the vehicle's driving wheels. Positions O–V are stable, so the lever remains in the respective position if the driver releases the lever. The retarder function, however, always ceases as soon as the driver operates the vehicle's accelerator pedal 31, but the braking effect of the retarder comes in automatically as soon as the accelerator pedal is released when the control is in any of the positions I–V.

The retarder function may also operate as a constant speed maintenance function depending on operation of the brake pedal or of a button 63 on the control 61. The retarder's braking effect is then adjusted automatically so as to endeavour to maintain the vehicle's speed by progressively increasing the braking effect if the vehicle's speed increases. The button 62 may be used to bring this constant speed maintenance function in automatically upon activation of the brake pedal 29 and to keep it activated until the next time the accelerator pedal is operated.

The invention is applied in automatic gear changing in mechanical stepped gearboxes in which gear changes are executed without disengaging the clutch 41. With a view to achieving gentle disengagement of gears, it is important that the gear combination concerned is not subjected to any torque.

The invention is described in more detail with reference to the flow diagram in FIG. 2, which represents the fuel adjustment which takes place to a so-called zero-torque level before the gear is disengaged, and the associated partial flow diagram in FIG. 3, which represents the updating, which takes place after gear disengagement, of the friction factor $M_f$ which affects the zero-torque level or of the power take-off factor $M_{pto}$ which affects the zero-torque level. This fuel adjustment routine is stored in the microcomputer of the control unit 12. Zero-torque level here means a transmitted torque reduced in the gearbox.

Figure 4:
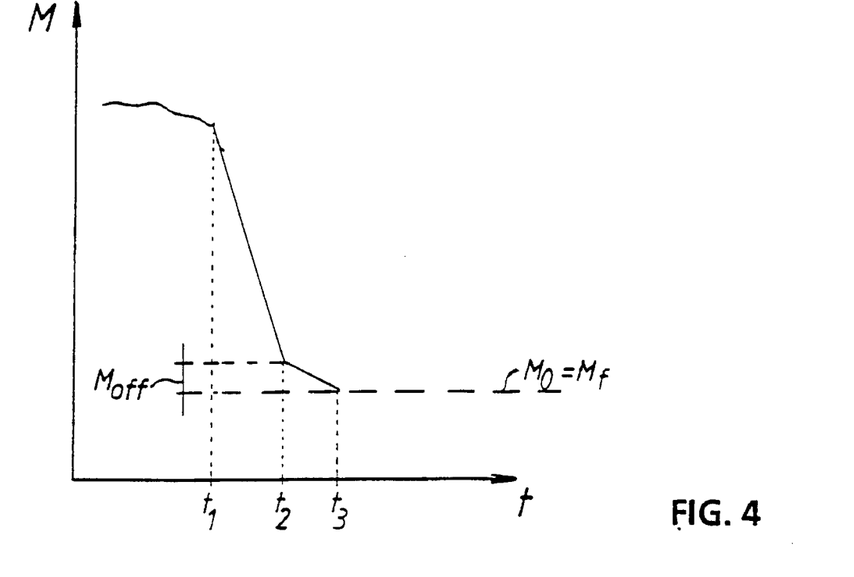
Fig. 4 shows how the engine torque is reduced to a fixed torque level independent of acceleration variations during torque reduction.

Fuel adjustment will normally reduce the engine torque to a fixed lower zero-torque level $M_0$ as shown in FIG. 4. This zero-torque level $M_0$ may correspond to the torque required for the engine to run at constant speed in no-load conditions, which corresponds to the torque $M_f$ required for overcoming the engine's internal friction losses. At time $t_2$ in FIG. 4 the torque begins to decrease with a rapid fuel reduction towards this zero-torque level $M_0/M_f$, and at time $t_2$ the disengagement of the gear is ordered so that the resulting response of the disengagement servo makes the gear disengage at time $t_3$. Time $t_2$ may be defined by an offset value $M_{off}$ above the desired zero torque $M_0$. $M_{off}$ is decreased by quicker response by the disengagement servo. At the same time as gear disengagement is ordered at time $t_2$, or a slightly displaced time, a slower fuel reduction with lower derivative is activated, resulting in gentler gear disengagement. Torque adjustments towards a fixed level, particularly the adjustment described above towards a zero torque $M_0$ which corresponds to the torque required for maintaining the engine at a constant no-load speed, have undesirable effects when driving on uphill or downhill runs. On downhill and uphill runs where the vehicle accelerates or decelerates respectively during torque reduction, the vehicle will urge on or retard the engine, imposing on the gearwheel which is to be disengaged a negative or positive torque load proportional to the current acceleration or deceleration.

Figure 2:
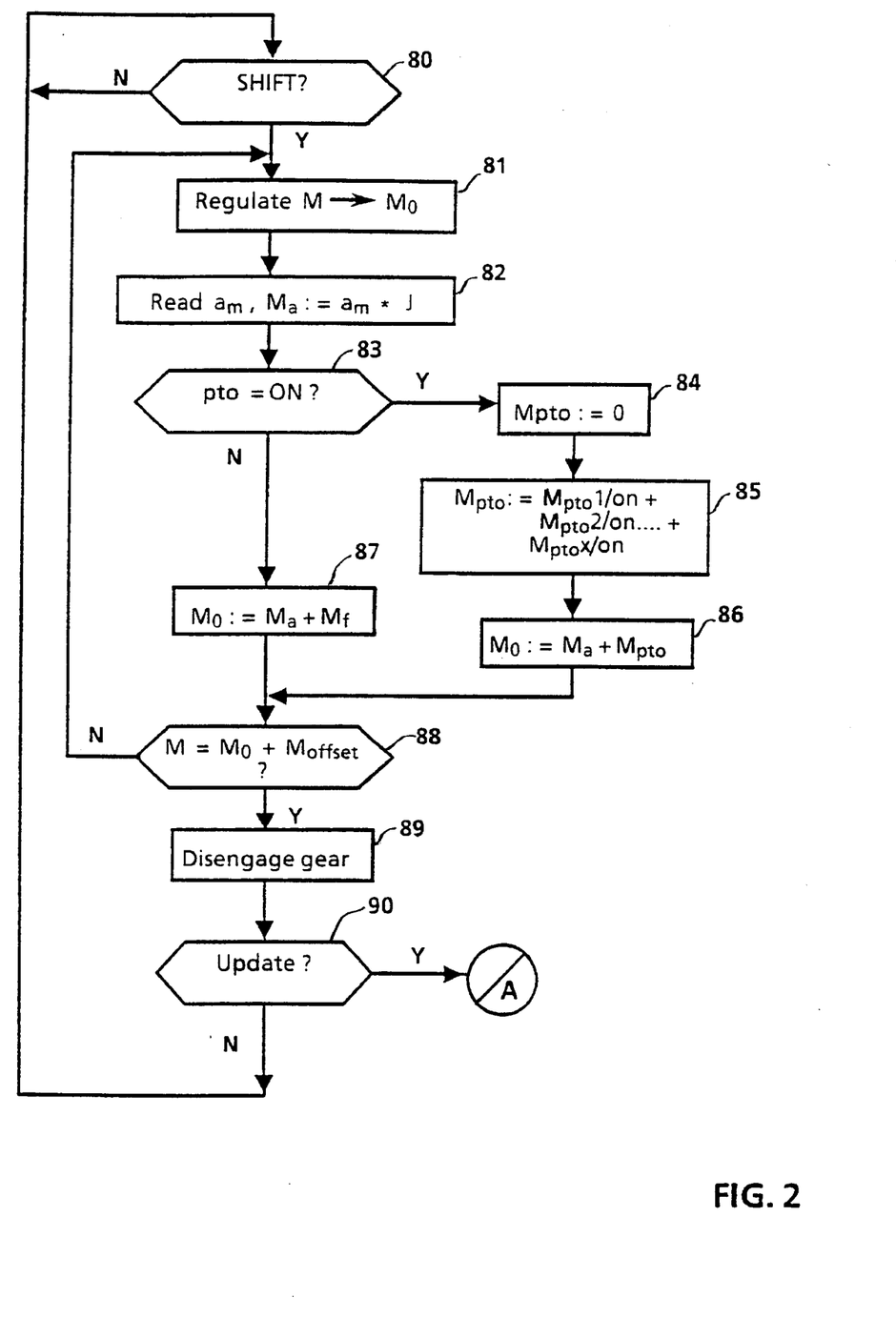
FIG. 2 shows a flow diagram for fuel quantity adjustment during gear disengagement.

According to the invention, the abovementioned problem is eliminated by compensating the zero torque $M_0$ continuously during fuel reduction, on the basis of at least the instantaneous engine acceleration before gear disengagement, using a control routine as per FIG. 2.

A first interrogation step 80 checks whether any gear change (upshift or downshift) is applicable. So long as no gear change is applicable, the control routine reverts to the main programme. The interrogation step is activated in a programme loop which is run through at a frequency of 100 Hz (hertz). Checking on whether gear changing is applicable thus takes place 100 times per second.

Figure 5:
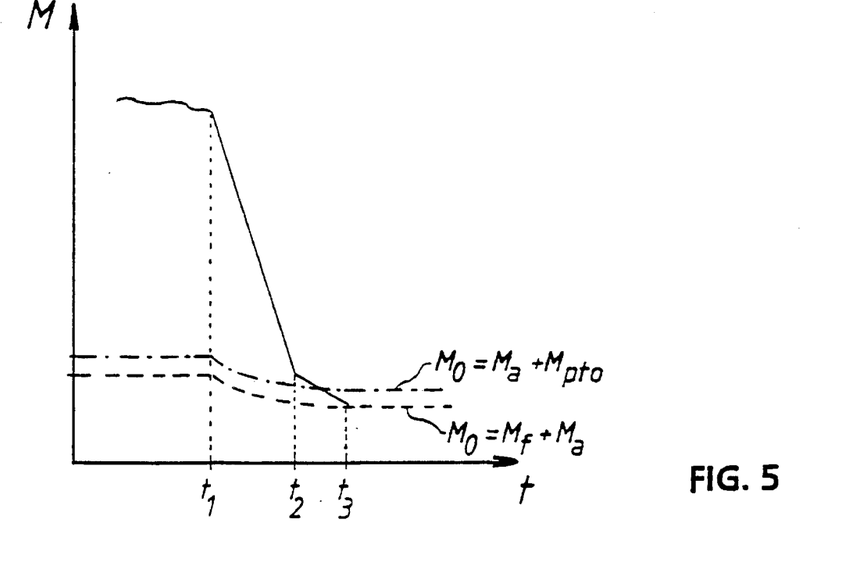
Fig. 5 shows how the engine torque is reduced to a zero-torque level which is adapted continuously during torque reduction and to a zero-torque level adapted to the current engine acceleration.

If a gear change is applicable, the control routine goes on to step 81, which initiates an adjustment towards zero-torque level, in this particular case a reduction in engine torque, i.e. a reduction in the fuel quantity injected. FIG. 5 illustrates how the torque M begins to decrease at time $t_1$ as a consequence of the reduction initiated at step 81, with a defined fuel reduction with constant derivative. The torque reduction is effected by the control unit 12, which overrides the accelerator pedal position.

When torque reduction has been initiated at time $t_1$, the control routine goes on to step 82, which detects the instantaneous engine acceleration $a_m$. The engine acceleration detected is used for deriving the zero-torque correction (hereinafter called the acceleration factor $M_a$) which is required for imparting to the engine the same acceleration even after the gear has been disengaged. This acceleration factor $M_a$ depends on the current engine acceleration $a_m$ and on the engine's moment of inertia J. The acceleration factor $M_a$ is calculated as $a_m*J'$, where J' denotes the engine's moment of inertia, which is in principle an empirically determined constant value for each type of engine, and also incorporates a conversion factor for adapting the parameters involved to the correct units. The moment of inertia J depends closely on the weight and physical shape of the engine's rotating components, which means that for a given type of engine the moment of inertia is generally substantially constant between individual engines of the same type.

After calculating the acceleration factor $M_a$, the control routine goes on to step 83, where detection of any power take-offs (pto) is activated. The unit can preferably detect an operating power take-off by detecting whether a switch for the power take-off has been activated, corresponding to the switch 45 for the exhaust brake and its signal line 7 connected to the control unit. If any power take-offs are switched on in order to be driven by the engine, this requires a higher zero-torque level $M_0$ with a power take-off factor $M_{pto}$ which corresponds to the additional torque which, when power take-offs are switched on but with power take-offs switched on, is required for the engine to run at constant speed in no-load conditions. If any power take-offs are switched on, the control routine goes on first to step 84, which zeroes the previously calculated power take-off factor $M_{pto}$ before going on to step 85, which calculates the current power take-off factor $M_{pto}$. The power take-off factor $M_{pto}$ comprises the aggregate of the additional torques required by the various power take-offs. Switching on individual small auxiliary units such as generators, small interior air conditioning systems and engine cooling system fans normally requires no zero-torque level correction, since the power offtake is relatively low, but the connection of cooling units in refrigeration vehicles or other large power offtakes requires a significant zero-torque correction. Similarly, simultaneous switching on of several small power take-offs requires zero-torque correction.

When step 85 has calculated the instantaneous acceleration factor $M_a$ and the power take-off factor $M_{pto}$ (the latter at step 85 if power take-offs are connected), the next step 86 calculates the instantaneously necessary zero torque $M_0$ as $M_0=M_a+M_{pto}$.

If step 83 detects no power take-offs switched on, the control routine goes on instead to step 87, which corrects the instantaneously necessary zero torque $M_0$ by a friction factor $M_f$ which corresponds to the additional torque required for the engine to run at constant speed in no-load conditions when no power take-offs are connected. $M_f$ is a factor which depends on the current engine speed n and the current engine temperature T. For each type of engine the friction $M_f$ may be stored in a matrix for a number of reference points (n,T) between which interpolation is performed with respect to current engine speed and temperature. The programme for each new engine and for each type of engine preferably incorporates an empirically established friction factor matrix $M_f(n,T)$ which can be updated in a manner described later on the basis of differences between individual engines or changes in the engine's internal friction.

When the instantaneously necessary zero torque $M_0$ has been calculated at step 87 or 86 on the basis of power take-offs switched on, the control routine goes on to step 88, which checks whether the current torque M has been reduced to the torque level shown in FIG. 5 at time $t_2$. If the torque has not been reduced to that level, the control routine then goes back to step 81 and runs through steps 81–88 again. The result is continuous correction of the necessary zero-torque level $M_0$ during fuel reduction between times t1 and $t_2$.

FIG. 5 shows how this continuous lowering may take place during fuel reduction carried out on an uphill run where the vehicle begins to decelerate during torque/fuel reduction. The lower zero-torque level $M_0$ represented by the broken line is a necessary zero-torque level in operating situations when no power take-offs are being powered by the engine. This zero-torque level $M_0$ begins at time $t_1$ when fuel reduction begins to lower the corresponding reduction in the zero-torque level $M_0$ brought about by the acceleration factor $M_a$. Conversely, if the fuel reduction takes place on a downhill run, there is a corresponding rise in the zero-torque level $M_0$ as from time $t_1$.

As illustrated in FIG. 4, the ordering of gear disengagement takes place at time $t_2$, when the current torque M is at a level above the necessary zero-torque level $M_0$. This level is defined by a preferably constant offset value $M_{offset}$ which is adapted to the response time from when gear disengagement is ordered to when the gear disengages, thereby controlling gear disengagement so that it takes place when the current torque M coincides with the necessary zero-torque level $M_0$ at time $t_3$. When this condition is fulfilled at step 88, the control routine goes on to step 89 and gives the order at time $t_2$ for gear disengagement, so that gear disengagement can take place at a zero-torque level appropriate to the instantaneous engine acceleration.

When power take-offs are operating, a higher zero-torque level is applied, as depicted in FIG. 5 by the chain-dotted zero-torque level $M_0=M_a+M_{pto}$. The same offset value $M_{off}$ then causes gear disengagement to be ordered earlier, before $t_2$, so that the current torque M similarly coincides with the increased zero-torque level $M_0=M_a+M_{pto}$ when the gear disengages at a time earlier than time $t_3$.

As not only the friction factor $M_f(n,T)$ but also the power take-off factor $M_{pto}(n,T)$ tend to change over a long operating period because of engine wear and/or wear or other changes in power take-offs or units connected to them, updating of the friction factor $M_f$ and the power take-off factor $M_{pto}$ is required at the next step.

Figure 3:
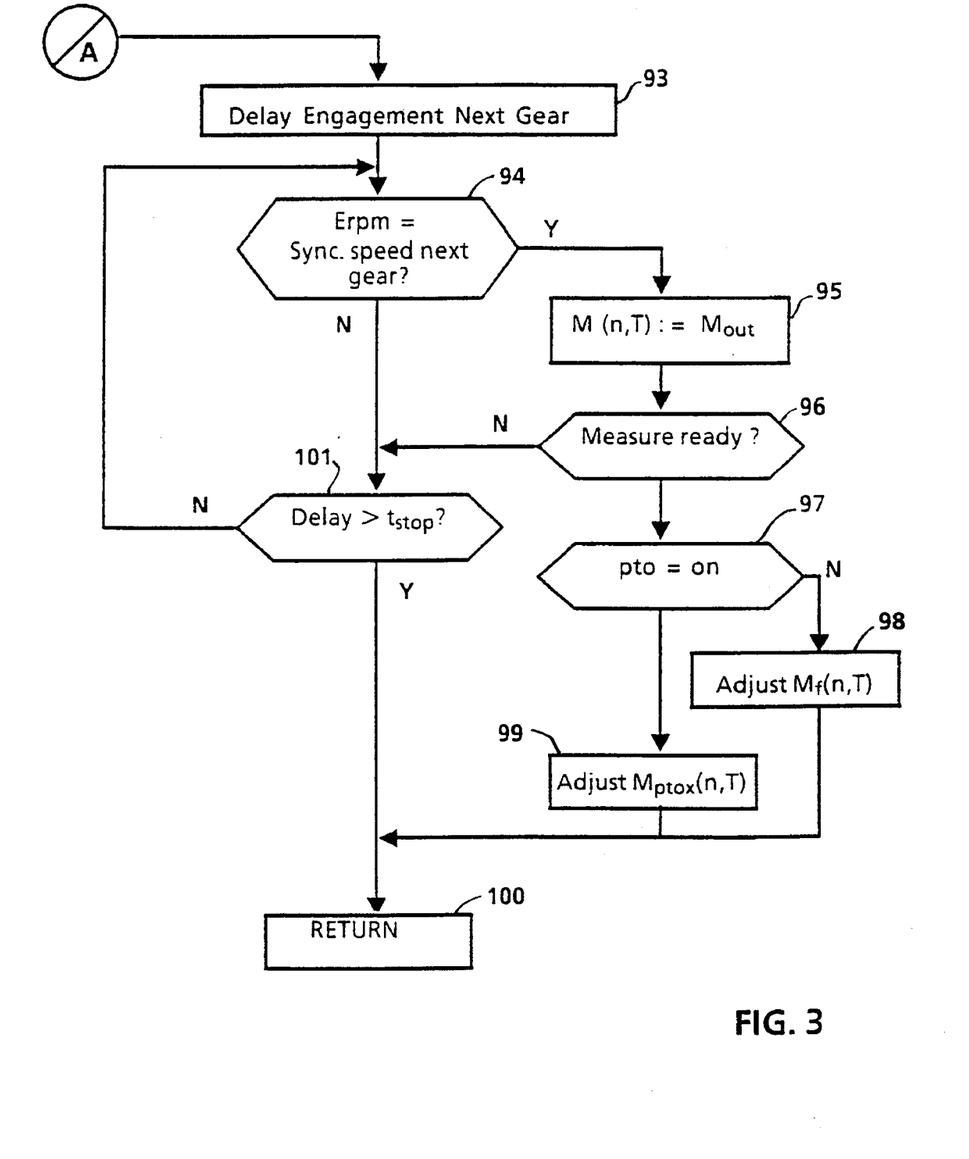
FIG. 3 shows a partial flow diagram pertaining to the flow diagram in FIG. 2, in which the engine torque increase is updated.

After step 89, the control routine goes on to step 90, which checks whether updating should be carried out. It is advantageous for this check to be performed when the current engine parameters do not indicate that the driver requires any rapid gear change response, since updating actually requires a certain gear change delay for calculation of new updated values for the friction factor $M_f$ and the power take-off factor $M_{pto}$. Examples of parameters indicating a rapid response requirement include exhaust brake activated or accelerator pedal depressed. If updating is not applicable, the programme returns to the initial position of monitoring the initiation of the next gear change at step 80. Reversion to step 80 without updating also takes place if deceleration or acceleration of the vehicle exceeds a predetermined set-value, since such deceleration/acceleration would result in incorrect updating of the friction factor $M_f$ and the power take-off factor $M_{pto}$. An example of an advantageous set-value is propeller shaft speed increasing or decreasing by more than 30 rpm/s. Updating will thus only take place in the course of gear changes where rapid response is not required or when the vehicle is not on uphill or downhill runs. The slight gear change delay involved in updating can then take place in the course of gear changes for which there is relatively ample time, without the delay causing impaired response in situations where rapid gear changes are required, or which do not involve risk of the vehicle losing or gaining speed to any perceptible extent.

Where updating is applicable, the control routine embarks on an updating sequence depicted in partial flow diagram A, FIG. 3, in which a first step 93 initiates temporary blocking of the engagement of the next gear. The updating sequence then goes on to step 94, which checks whether the engine speed has been adjusted to a speed synchronous with the next gear. Until this synchronous speed is reached, the updating sequence goes into a loop from step 94 to step 101 and back to step 94.

Step 101 performs a safety function in monitoring the delay of the engagement of the next gear, and when the delay exceeds a predetermined value $t_{stop}$, advantageously between 1.2 and 1.9 seconds, this indicates that the synchronous speed has not been reached within a reasonable time. When the delay exceeds this time $t_{stop}$, the updating sequence is dropped and no updating takes place in the course of the current gear change because the temporary blocking of the engagement of the next gear is cancelled and the main programme is reverted to at step 100.

If the engine speed reaches synchronous speed within the predetermined time $t_{stop}$, the updating sequence goes on to step 95, which updates the current torque M(n,T) and stores in the memory of the control unit the current speed n and the current engine temperature T with the instantaneous torque $M_{out}$, which is modulated to maintain synchronous speed. As the modulated torque may be subject to variations if a speed-controlled fuel regulator is used, step 95 calculates a current torque averaged over a certain time. Step 96 checks whether the calculation at step 95 has been completed, and if it has not been completed the updating sequence goes on to step 101. On completion of calculation at step 96, the updating sequence goes on to step 97, which checks whether any power take-offs are switched on. If any power take-offs are switched on, the power take-off factor $M_{ptox}$ stored in a matrix $M_{ptox}(n,T)$ is updated at step 99, but if no power take-offs are switched on the friction factor $M_f$ stored in a matrix $M_f(n,T)$ is updated at step 98.

The power take-off factor $M_{pto}$ thus incorporates not only the necessary additional torque required for power take-offs switched on but also the necessary additional torque required by the engine's internal friction. This means that $M_{pto}(n,T)$ and $M_f(n,T)$ respectively constitute two separate correction matrices used alternatively depending on whether any power take-offs are operating or not.

The invention may be modified in a number of ways within the scope of the patent claims. For example, the vehicle acceleration may be monitored in connection with gear disengagement for determining the acceleration factor $M_a$, which during the period before gear disengagement is a parameter which is equivalent to engine acceleration. Adjustment based on a propeller shaft sensor instead of an engine speed sensor gives the same results, since the acceleration value is the same until the gear concerned disengages.

In a more developed embodiment, however, adjustment based on an engine sensor may incorporate acceleration factor correction should it appear that engine acceleration after gear disengagement would change to any substantial extent.

This is done by comparing the engine's free acceleration at reduced zero-torque level $M_0$ immediately after gear disengagement with the engine's acceleration generally substantially instantaneously before gear disengagement, and with correction of the inertia factor J pro rata to any difference between these accelerations.

The essential point for the invention is that the zero-torque level during torque adjustment is continuously adapted to the acceleration or deceleration of the engine/vehicle, resulting in torque adjustment towards a dynamic set-value depending on the vehicle's rolling resistance. Without that dynamic set-value, gear change problems arise on uphill or downhill runs where the vehicle respectively retards or urges on the engine, thereby causing in the gearbox an undesirable torque which hinders disengagement of the current gear.

The invention is also applicable in operating situations in which gear changing is initiated when the engine delivers a retarding torque, e.g. when the accelerator pedal is released on a downhill run, contrary to the situation represented in FIGS. 4 and 5 in which gear changing is initiated when the engine is delivering an impelling torque. At a time of retarding torque from the engine, adjustment is therefore from a torque level M which is in fact below the zero-torque level $M_0$. The fuel reduction depicted in FIGS. 4 and 5 is then replaced by a fuel increase which in principle corresponds to a zero-torque level mirror image of the fuel adjustment depicted in FIGS. 4 and 5, whereby $M_{offset}$ results in the ordering of gear disengagement at a current modulated torque which is lower by the value $M_{offset}$ than the zero-torque level continuously corrected during fuel increase.

$M_{offset}$ may also be corrected with respect to any changes in the response of the gear disengagement servo.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A method in an automatic computer controlled control system for changing gears in a mechanical stepped gear box in a vehicle powered by a combustion engine for reducing the torque delivered by the engine in connection with the disengagement of a gear, which method comprises the steps of:

(a) measuring the acceleration of the engine $a_m$;

(b) determining an acceleration factor $M_a$ as a function of the measured engine acceleration $a_m$;

(c) before disengagement of a gear reducing the torque delivered by the engine to a zero-torque level $M_0$ which is a function at least of the acceleration factor $M_a$;

(d) disengaging the gear; and (e) after disengagement of the gear, accelerating the engine to a value corresponding to the engines instantaneous value of acceleration of the engine before disengagement of the gear.

2. A method according to claim 1, wherein during torque reduction before gear disengagement the acceleration factor $M_a$ is continuously corrected on the basis of any engine acceleration changes.

3. A method in an automatic computer controlled control system for changing gears in a mechanical stepped gear box in a vehicle powered by a combustion engine for reducing the torque delivered by the engine in connection with the disengagement of a gear, which method comprises the steps of:

(a) measuring the acceleration of the engine $a_m$;

(b) determining an acceleration factor $M_a$ as a function of the measured engine acceleration $a_m$;

(c) before disengagement of a gear reducing the torque delivered by the engine to a zero-torque level $M_0$ which is a function at least of the acceleration factor $M_a$;

(d) disengaging the gear; and (e) after disengagement of the gear, accelerating the engine to a value corresponding to the engines instantaneous value of acceleration of the engine before disengagement of the gear, wherein during torque reduction before gear disengagement, the acceleration factor $M_a$ is continuously corrected on the basis of any engine acceleration changes and wherein the acceleration factor $M_a$ is the product arrived at by multiplying an inertia factor J, which depends on the engine's moment of inertia, by the engine acceleration $a_m$.

4. A method according to claim 3, wherein the inertia factor J is dependent on the moment of inertia of the engine and is constant for each type of engine.

5. A method according to claim 4, wherein the acceleration of the engine at reduced zero-torque level $M_0$ immediately after gear disengagement is compared with the acceleration of the engine generally substantially instantaneously before gear disengagement, and the inertia factor J is corrected based on any difference between these accelerations.

6. A method in an automatic computer controlled control system for changing gears in a mechanical stepped gear box in a vehicle powered by a combustion engine for reducing the torque delivered by the engine in connection with the disengagement of a gear, which method comprises the steps of:

(a) measuring the acceleration of the engine $a_m$;

(b) determining an acceleration factor $M_a$ as a function of the measured engine acceleration $a_m$;

(c) before disengagement of a gear reducing the torque delivered by the engine to a zero-torque level $M_0$ which is a function at least of the acceleration factor $M_a$;

(d) disengaging the gear; and (e) after disengagement of the gear, accelerating the engine to a value corresponding to the engines instantaneous value of acceleration of the engine before disengagement of the gear, wherein the zero-torque level $M_0$ is also a function of a friction factor $M_f$ which corresponds to the internal friction of the engine and which depends on the torque required for the engine to run at constant speed in no-load conditions.

7. A method according to claim 6, wherein the friction factor $M_f$ is a function of the engine speed n and the engine temperature T.

8. A method according to claim 7, wherein the friction factor $M_f$ is continuously measured and stored and wherein the value of the friction factor $M_f$ is updated by delaying the engagement of a next gear to be engaged, adjusting the engine towards the synchronous speed of the next gear, determining an engine torque required to maintain the engine at the synchronous speed, and storing such torque value as the updated value of $M_f$.

9. A method according to claim 8, wherein the friction factor $M_f$ is updated only when no power take offs are being driven by the engine.

10. A method according to claim 6, wherein the zero-torque level $M_0$ is the aggregate of at least the acceleration factor $M_a$ and the friction factor $M_f$.

11. A method in an automatic computer controlled control system for changing gears in a mechanical stepped gear box in a vehicle powered by a combustion engine for reducing the torque delivered by the engine in connection with the disengagement of a gear, which method comprises the steps of:

(a) measuring the acceleration of the engine $a_m$;

(b) determining an acceleration factor $M_a$ as a function of the measured engine acceleration $a_m$;

(c) before disengagement of a gear reducing the torque delivered by the engine to a zero-torque level $M_0$ which is a function at least of the acceleration factor $M_a$;

(d) disengaging the gear; and (e) after disengagement of the gear, accelerating the engine to a value corresponding to the engines instantaneous value of acceleration of the engine before disengagement of the gear, wherein the zero-torque level $M_0$ is also a function of a power take-off factor $M_{pto}$ which depends on the additional torque required for powering at least one power take-off driven by the engine while maintaining the engine at a constant speed in otherwise no-load conditions.

12. A method according to claim 11, wherein the power take-off factor $M_{pto}$ is also a function of the friction factor $M_f$.

13. A method according to claim 11, wherein the zero-torque level $M_0$ is the aggregate of at least the acceleration factor $M_a$ and the power take-off factor $M_{pto}$.

14. A method according to claim 11, wherein the power take-off factor $M_{pto}$ has a number of levels corresponding to the number of power take-offs or power take-off combinations $PTO_n$ that can be driven by the engine.

15. A method according to claim 14, wherein the level of the power take-off factor $M_{pto}$ for each of the operable power take-offs or power take-off combinations $PTO_n$ is continuously measured and stored and wherein the factor $M_{pto}$ is updated by delaying the engagement of a next gear to be engaged, adjusting the engine towards the synchronous speed of the next gear, determining an engine modulated torque value required to maintain the synchronous speed steady, with the engine in otherwise no-load conditions, and storing this value as the updated value of $M_{pto}$.

16. A method according to claim 15, wherein the factor $M_{pto}$ is updated only when no more than one power take off is being driven by the engine.

* * * * *